United States Patent [19]

Seok-Yong et al.

[11] Patent Number: 5,453,593

[45] Date of Patent: Sep. 26, 1995

[54] METHOD FOR CLASSIFYING DISCHARGE MACHINING WAVE PATTERNS, AND METHOD FOR PREVENTING ARCS BASED ON THE CLASSIFICATION OF THE DISCHARGE MACHINING WAVE IN DISCHARGE

[75] Inventors: Seo Seok-Yong, Seoul; Kim Byung-Guk; O. Seung-Young, both of Daejeon; Kim Doo-Won, Seoul; Jeong Ju-Yong, Gunpo, all of Rep. of Korea

[73] Assignee: Korea Atomic Research Institute, Daejeon, Rep. of Korea

[21] Appl. No.: 145,637

[22] Filed: Nov. 4, 1993

[51] Int. Cl.$^6$ ........................................... B23H 1/02
[52] U.S. Cl. ................................ 219/69.18; 219/69.13; 219/69.17
[58] Field of Search ........................ 219/69.13, 69.17, 219/69.18

[56] References Cited

U.S. PATENT DOCUMENTS

| | | | |
|---|---|---|---|
| 4,338,504 | 7/1982 | Gray | 219/69.17 |
| 4,504,722 | 3/1985 | Kishi et al. | 219/69.18 |
| 4,673,791 | 6/1987 | Konno et al. | 219/69.17 |
| 4,700,039 | 10/1987 | Konno et al. | 219/69.13 |
| 4,806,719 | 2/1989 | Seerieder et al. | 219/69.13 |
| 4,892,989 | 1/1990 | Itoh | 219/69.13 |
| 5,118,915 | 6/1992 | Magara | 219/69.13 |
| 5,182,474 | 1/1993 | Kaneko | 219/69.18 |

FOREIGN PATENT DOCUMENTS

| | | | |
|---|---|---|---|
| 55-48531 | 4/1980 | Japan | 219/69.13 |
| 59-192421 | 10/1984 | Japan | 219/69.13 |

OTHER PUBLICATIONS

Correlation Between Electro– Discharge Machining Data and Machining Settings, by Snoeys et al., CIRP, pp. 83–89, vol. 24, 1974.
Monitoring and Controlling the E.D.M. Process, by Bhattacharyya et al., Journal of Engineering for Industry, vol. 102, pp. 189–194, Aug. 1980.
The Effect of the Surface Roughness of the Electrode Tool on Electric Discharge Machining Conditions, by Otto et al., Soviet Engineering Research, pp. 97–101, vol. 3, No. 11.
A New EDM Adaptive Control Plan Using Self-tuning Control Algorithm, by Wemin, Proc. Mfg. Int. 1988, vol. ASME (1988).
A Data–Dependent Systems Approach to Optimal Microcomputer Control Illustrated, by EDM, by Pandit et al., Journal of Engineering for Industry,pp. 1376–142, May 1984, vol. 106.
On the Derivation and Application of a Real–Time Tool Wear Sensor in EDM, by, Dauw, Annals of the CIRP, pp. 111–116, vol. 35/Jan. 1986.
Verification of on–line Computer Control of EDM by Data Dependent Systems, by, Pandit et al., Journal of Engineering for Industry, pp. 117–121, May 1987, vol. 109.
Computer Aided Evaluation and Control of Electric Discharge Machining by Using Properties of Voltage Pulse Trains, by Cogun, pp, 237–247, ASME, ped, vol. 34 (1988).

Primary Examiner—Geoffrey S. Evans
Attorney, Agent, or Firm—Nikaido, Marmelstein, Murray & Oram

[57] ABSTRACT

A method for classifying electro-discharge machining wave patterns by using a delay circuit, and a method for preventing arcs by classifying the electro-discharge machining waves. The voltage or current waves which are generated during an electro-discharge machining operation are classified by using high and low reference levels. Then the signals are delayed, inverted and AND-logic-combined to obtain a monitoring signal. The voltage or current waves are sampled immediately before the off-state of the delayed and inverted pulse, thereby classifying each of the electro-discharge machining waves. Thus the voltage or current waves which are generated during an electro-discharge machining operation are classified. Then, by utilizing the result of the classification, and interrupting the EDM discharge power immediately and momentarily when a wave is classified as an arc wave, damage due to the occurrence of arcs is prevented.

6 Claims, 12 Drawing Sheets

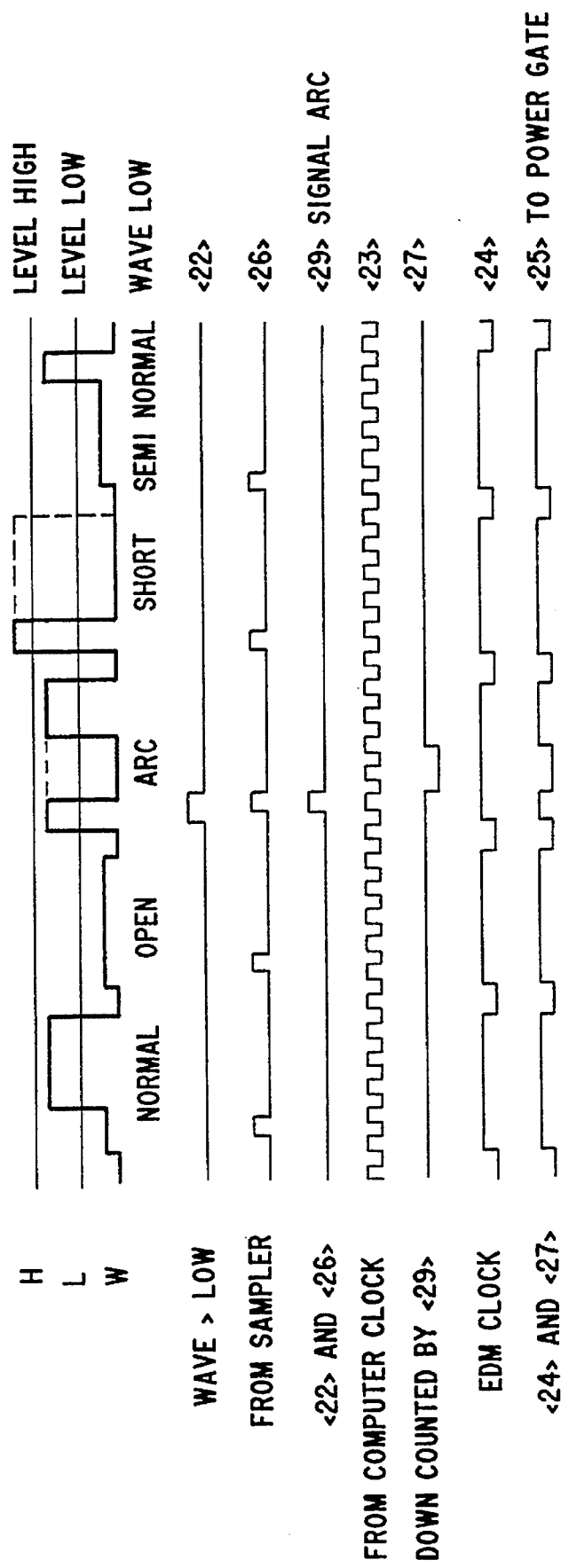

METHOD FOR CLASSIFYING DISCHARGE MACHINING WAVE PATTERNS, AND METHOD FOR PREVENTING ARCS BASED ON THE CLASSIFICATION OF THE DISCHARGE MACHINING WAVE IN DISCHARGE

FIELD OF THE INVENTION

The present invention relates to a method for classifying electro-discharge machining wave patterns and also relates to a method for preventing arcs based on the classification of the electro-discharge machining wave patterns in an electro-discharge machining apparatus.

BACKGROUND OF THE INVENTION

Conventionally, there have been disclosed a number of wave pattern classifying methods for the purpose of monitoring the generation of harmful or non-harmful waves.

As the principal approaches for monitoring the state of electro-discharge machining, there are methods such as: analyzing the radio frequency generated during the discharge sparking; measuring and analyzing the electric resistance between the electrode and the object to be machined; and analyzing the discharge wave patterns. Among them, the most preferred was the method of analyzing the wave patterns.

The studies on the analysis of the electro-discharge machining wave patterns which have been carried out so far can be summarized as follows.

That is, the following persons studied on the electro-discharge machining wave patterns: R. Snoeys (CIRP vol 24, 1974), S Bhattacharyya (AASME J. of Eng. Ind., 1980), M. Otto (ISEM7, 1983). A. Endel (ISEM7, 1983), S. Pandit (ASME J. of Eng. Ind., 1984), D. Dauw (CIRP vol 35, 1986,) S. Pandit, ASME J. of Eng. Ind., 1987), and C. Cogun (ASME PED vol 34, 1988).

The contents of the conventional studies are different from the first objective of the present invention in one point. That is, there is a difference in the sampling method. In the conventional studies, there is never found the sampling method of the present invention. In order to clarify this point, the known facts about the discharge wave patterns which occur during an electro-discharge machining operation will be briefly described.

Generally, during a transistorized pulsed electro-discharge machining (to be called "electro-discharge machining" below), 5 types of voltage or current wave patterns (voltage=current x resistance) are generated in a random manner. That is, waves of the normal or effective discharge, arc, short, open and semi-normal discharge are generated (refer to FIG. 1). Of them, only the normal discharge and the semi-normal discharge waves are effective ones. The open wave is not desirable because it lowers the machining efficiency, while the short and arc can damage both the machining apparatus and to the object to be machined, if they continue for a long time. Accordingly, if the 5 wave patterns can be classified at a high speed, it can contribute to monitoring the electro-discharge machining.

The conventional wave pattern classifying method will be described below. There is a difficulty in classifying the 5 types of waves if only the comparison of the voltage levels is used. Therefore, another reference level or another sampling method has to be introduced. In this case, the sampling is carried out by distinguishing the discharge pattern into an initial period and a final period.

Conventionally, a number of methods have been disclosed for the purpose of monitoring the generation of harmful arcs. The discrimination as to whether there are arcs is made based on the increase of the average current or the drop of the voltage across the discharge electrode, thereby preparing for future measures against the generation of arcs. For example, measures such as causing an off-time and the like are taken, with the result that effective results are gained.

However, such a conventional method is different from a second object of the present invention in two points. That is, a discrimination is carried out for every discharge pulse, and then a proper measure is taken before the completion of the individual pulse. In other words, the measurement, classification and adjustment are almost simultaneously carried out for every pulse.

SUMMARY OF THE INVENTION

A first object of the present invention is to provide a method in which two short samplings are carried out within a short time period for every discharge wave, in such a manner that one sampling is carried out at the initial stage of the wave, and another sampling is carried out at the final stage of the wave.

A second object of the present invention is to provide a method for classifying the patterns of the voltage and current waves which are generated during an electro-discharge machining operation, and to provide a method for preventing arcs based on the results of the classification.

Now the first object of the present invention will be described in more detail.

In achieving the first object of the present invention, the current wave patterns are classified by a method unlike the conventional methods.

First the generation of the discharge wave will be described.

The electro-discharge machining is carried out in such a manner that a dielectric (made of hydrocarbons such as light oil) is inserted between an electrode and an object to be machined to form a gap between them, and dc pulse voltages are supplied to the gap, so that sparking should occur under the proper condition. Owing to such sparking energy, a part of the object to be machined is evaporated, assisted by the great vaporizing pressure of the dielectric medium. As a result, a crater is formed on the object to be machined, and the average accumulation of the craters results in the machining of the object. Under this condition, the patterns of the voltage and current waves can be sampled. However, depending on the conditions, there is no guarantee that sparking will necessarily occur every time. For example, if the interelectrode gap is too large, open waves will be generated, and an actual machining will not occur. On the other hand, if the interelectrode gap is too small, short-circuit waves will be generated, and also machining will not be done. Further, a portion may have too small resistance compared with the rest of the portions due to the turbidness of the dielectric medium or other reasons. In this case, the discharge may be focused on the spot where the resistance is smaller, and this is called an arc. Generally, the electro-discharge machining apparatus should be designed such that the apparatus should generate a normal or effective discharge or a semi-normal discharge. However, practically, several or several score percent of ineffective or harmful waves are generated.

The primary purpose of classification is to monitor to decide whether waves are good or bad. Further, the obtained information can be used for automatic control of the discharge.

Regarding the classification by potential, a variable voltage which is formed by adjusting the received discharge waves is compared with a reference voltage which is set in advance by a circuit.

Of the classification methods, the classification by a logic circuit will now be described in detail. The classification is made by combining the methods of classifying by potential and by logic circuit.

The determination of the timing for the sampling is the most crucial point of the first object of the present invention. Regardless of the types, the discharge waves are repeating waves in which a cycle consists of an on-time and an off-time. In the first object of the present invention, the variables are sampled only at the initial stage of the on-time and immediately before the off-time. During the rest of the time, all the variations are disregarded. Particularly, it is the most important feature of the first object of the present invention to make a sampling immediately before the termination of the on-time. Particularly, it proves the superiority of the first object of the present invention that the above function can be carried out without difficulty even under random variation of the on-time and off-time.

BRIEF DESCRIPTION OF THE DRAWINGS

The above objects and other advantages of the present invention will become more apparent by describing in detail the preferred embodiment of the present invention with reference to the attached drawings in which:

FIG. 5b illustrates the detached open waves similarly to FIG. 5a;

FIG. 5c illustrates detected short circuit waves similarly to FIG. 5a;

FIG. 8b illustrates the same contents as that of FIG. 8a;

DESCRIPTION OF THE PREFERRED EMBODIMENT

Figure 1:
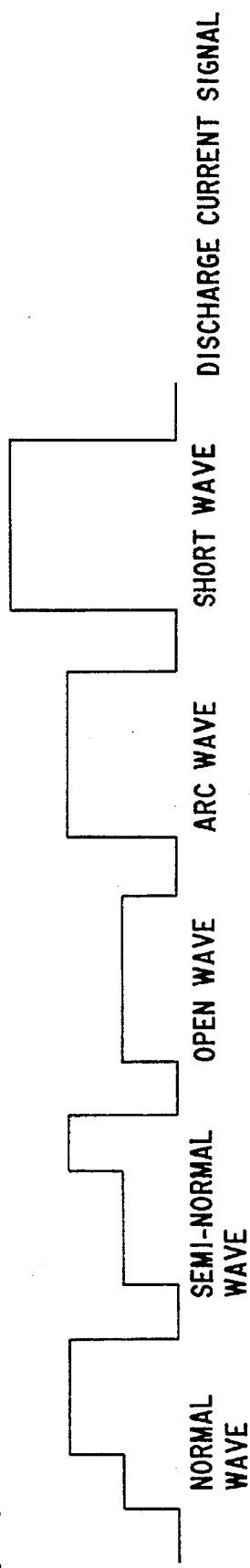
FIG. 1 is a schematic view of the discharge waves for illustrating the method of classifying the electro-discharge machining wave patterns utilizing a delay circuit.
Figure 2:
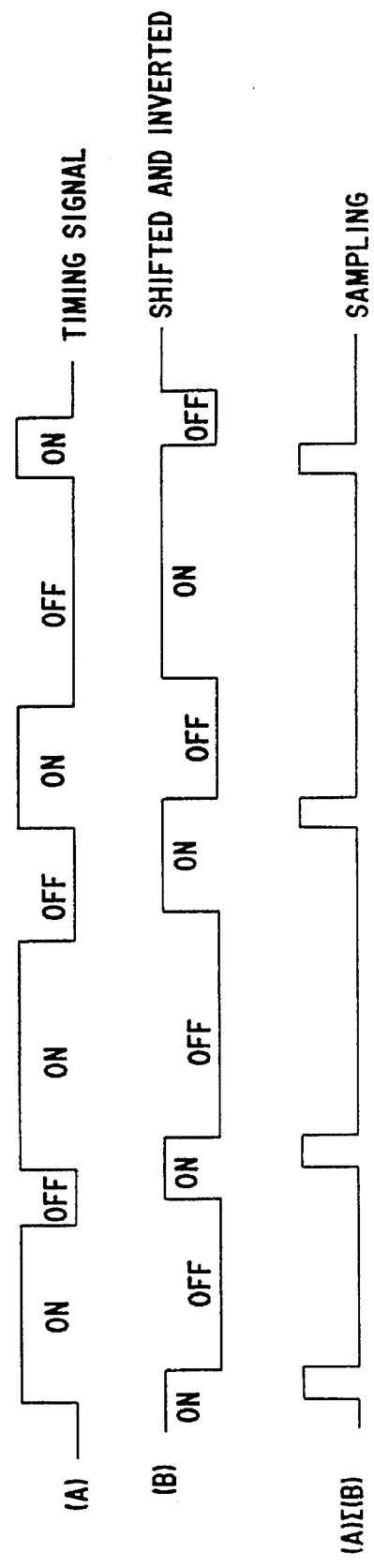
FIG. 2 is a logic chart for illustrating the principle of the known discharge wave classification method for showing the classification method based on a delay circuit.
Figure 3:
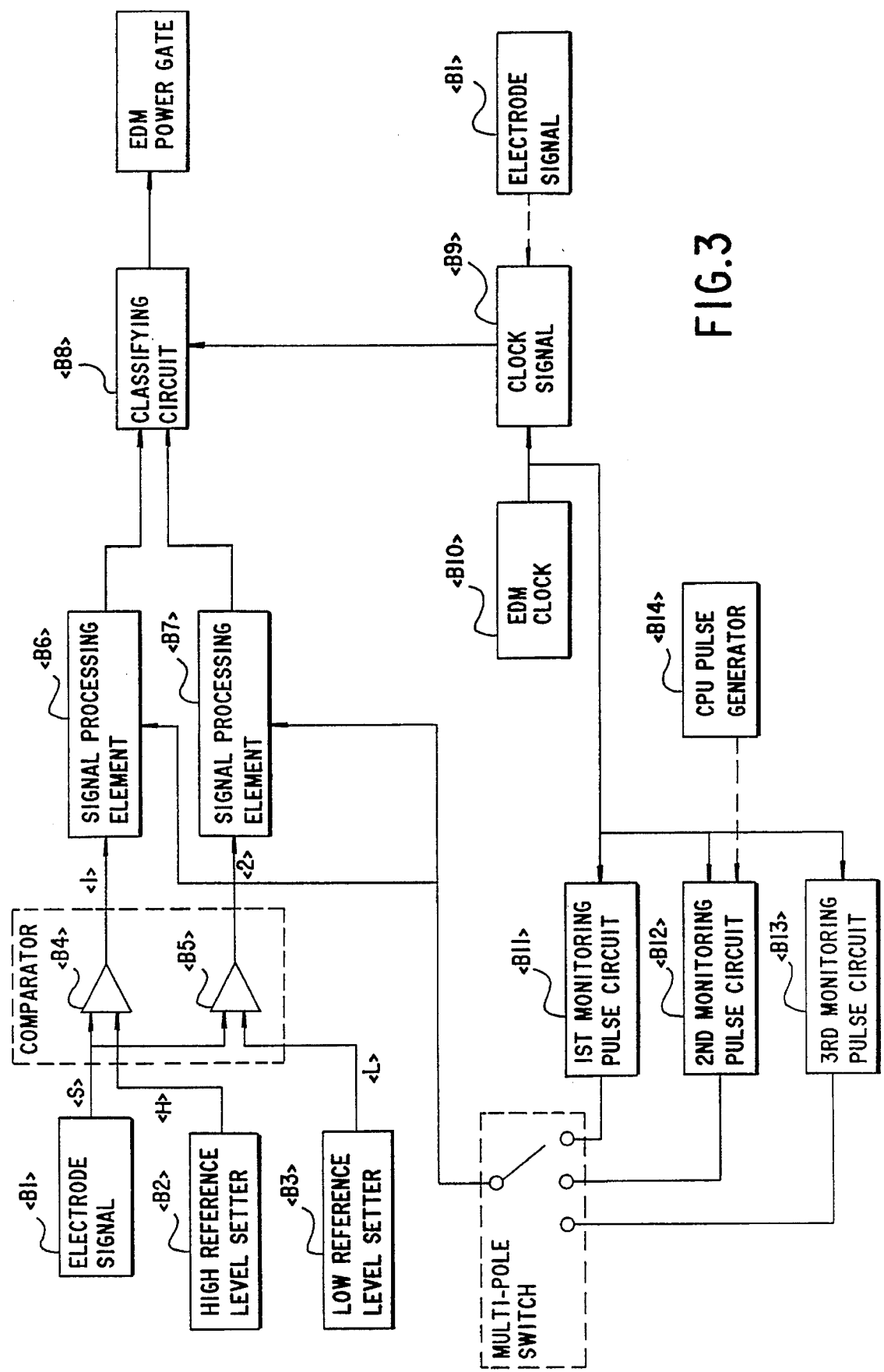
FIG. 3 is a logic circuit diagram illustrating the method of classification of electro-discharge machining wave patterns.

FIG. 3 is a block circuit diagram showing signal processing elements for performing the method used to classify electro-discharge machining wave patterns and to prevent damage from arcs and shorts.

Figure 4:
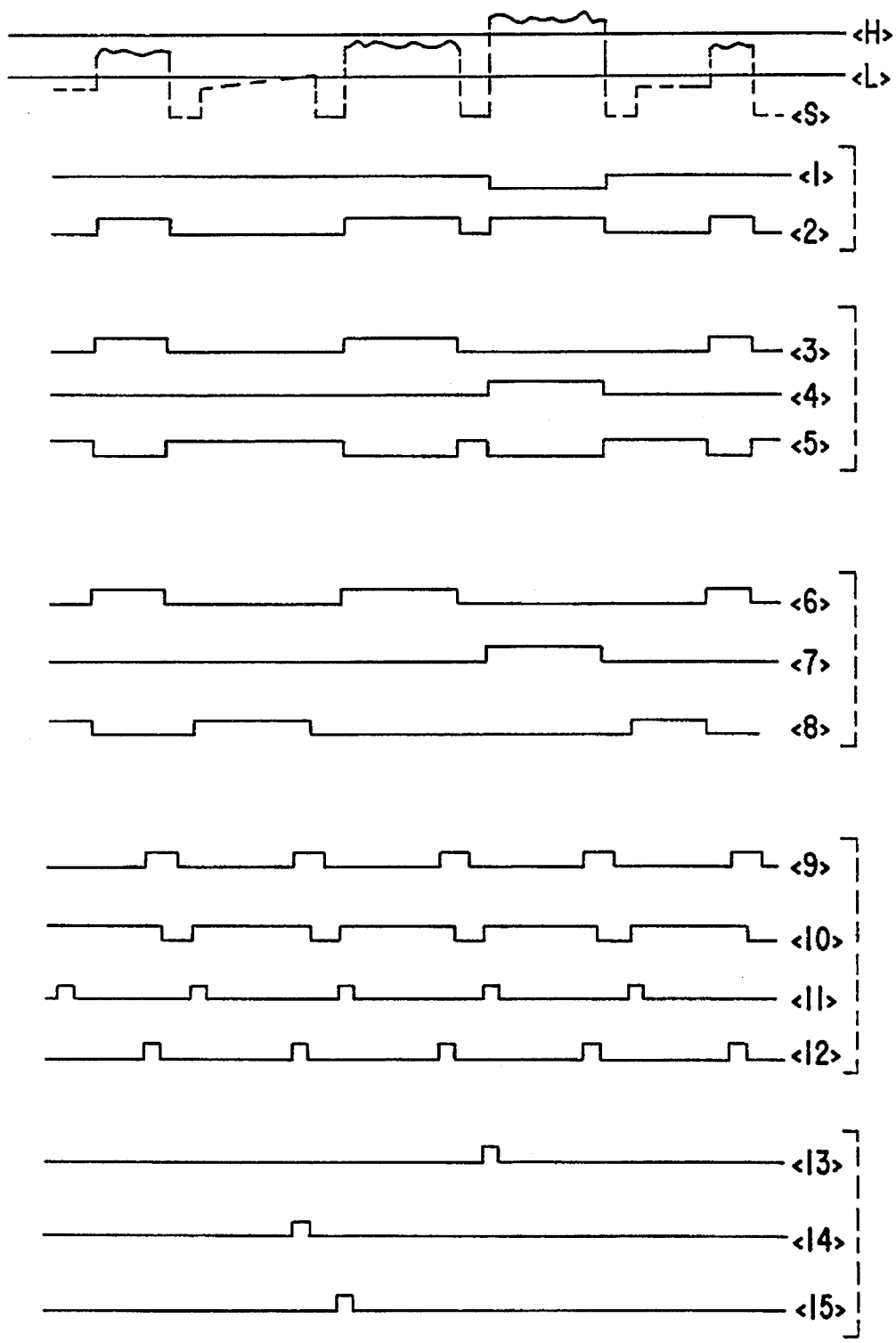
FIG. 4 illustrates the classification of electro-discharge wave patterns utilizing a delay circuit, in which, even if the on-off magnitudes of the reference clock for deciding the length of the pulse of the discharge wave is varied in a random manner, the short monitoring signals which are formed by an AND logic combination of the signals delayed for a certain period of time are generated at the same position relative to the reference pulses.

In this figure signal <B1> is an EDM electrode signal from which the signal <S> shown hereafter in FIG. 4 is derived, <B2> represents a setter for a high reference level signal <H>, and <B3> represents a setter for a low reference level signal <L>. A comparator <B4> compares <S> and <H> and outputs a signal level <1>, and a comparator <B5> compares <S> and <L> and outputs a signal level <2>. Signals <1> and <2> represent the lengths of time <S> exceeds <H> and <L>, respectively.

Signal processing elements <B6> and <B7> delay and invert signals <1> and <2>, respectively, and output AND logic signals of <1> and <2> compared with a signal from <B11>, <B12> or <B13>, described below. <B8> represents a classifying circuit that samples the output signals from <B6> and <B7> at a time determined by a clock signal <B9> to determine the type classification of the input wave pattern, and provides an output signal to a gate of a discharge-controlling transistor if an arc classification is determined.

<B10> represents an EDM clock signal which gates the power for electro-discharge machining. <B11> represents a first monitoring pulse circuit, which outputs a pulse signal based on the EDM clock signal according to the method of this invention. <B12> represents a second monitoring pulse circuit which provides a pulse signal controlled by pulse making software through a CPU pulse generator <B14>. <B13> represents a third monitoring pulse circuit which may provide a pulse determined by other means. One of the three monitoring pulse circuits is selected by a multi-pole switch, the selected pulses being fed to <B6> and <B7>.

In the logic chart of FIG. 4, <S> represents a discharge current variable (to be called input signal below), <H> a high reference potential set in advance, and <L> a low reference potential. As to the discharge current wave patterns, only 5 typical ones are shown for the sake of the convenience of description. Starting from the left side of the drawing, a normal or effective wave, an open wave, and arc wave, a short wave and a semi-normal wave are shown.

It should be noted that the normal or effective wave and the semi-normal wave are similar to each other. The waves which are capable of machining are the normal or effective wave, the semi-normal wave and the non-definite curve (oscillation) of a part of the arc wave. Therefore it should be understood that it is incorrect and erroneous to classify the semi-normal wave as an open wave as in the conventional method.

In FIG. 4, <1> indicates a logic signal for the case where the high potential is higher than the input signal <S>. <2> indicates a logic signal for the case where the input signal <S> is are higher than the low potential level. <3> indicates an AND logic signal for <1> and <2>.

<4> and <5> indicate inverted signals of <1> and <2> respectively. <9> indicates a signal of a main clock, and here, the magnitudes of the on and off are arbitrarily varied in accordance with the operating status of the discharge apparatus.

<10> indicates an inverted signal formed by delaying the signal <9>. In this case, the amount of delay is set in advance, and usually, the amount of delay is 10 micro seconds.

<6> indicates an AND signal for <10> and <3>. <7> indicates an AND logic signal for <10> and <4>, while <8> indicates an AND logic signal for <10> and <5>.

<11> indicates a signal generated by differentiation of the rising edge of signal <10>. This signal is used as a monitoring signal. <12> indicates an AND logic signal for <9> and <10>, and this signal is used as a monitoring signal. <13> indicates an AND logic signal for <7> and <11>. This signal is generated by the short wave, and therefore, this signal can be used for detecting short waves.

<14> indicates an AND logic signal for <8> and <12>. This signal is generated under the open state, and therefore, this signal can be used for detecting open waves.

<15> indicates an AND logic signal for <6> and <11>. This signal is generated only during an arc, and therefore, this signal can be used for detecting arc waves.

The normal or effective wave and semi-normal wave do not have to be detected.

A special feature is that two samplings are carried out during one cycle by utilizing the signals <11> and <12>, and that the signal <12> is positioned immediately before the off of the signal <10> which is the discharge gate signal. Particularly, as shown in FIG. 4, even if the on and off are randomly varied, the sampling can be carried out immediately before the off of the signal <10>. This advantage is not seen in any other of the signal <10> conventional methods.

Now an actual example for the first object of the present invention will be described.

EXAMPLE

An electro-discharge machining apparatus was driven by square waves in which the duration of one cycle was 480 micro seconds, and the on-time was 85%. The current signals of this apparatus was supplied to a wave pattern analyzing instrument, in order to see if the characteristic signals corresponding to the open wave, arc wave and short wave are outputted. The detector used was an ordinary oscilloscope, and the plotter used was Type A3.

A channel 2 was made to receive discharge current waves, while a channel 1 was made to receive in a sequential manner the characteristic signals corresponding to the above three waves. If all the signals are to be received simultaneously, a 4-channel instrument should be required.

Figure 5A:
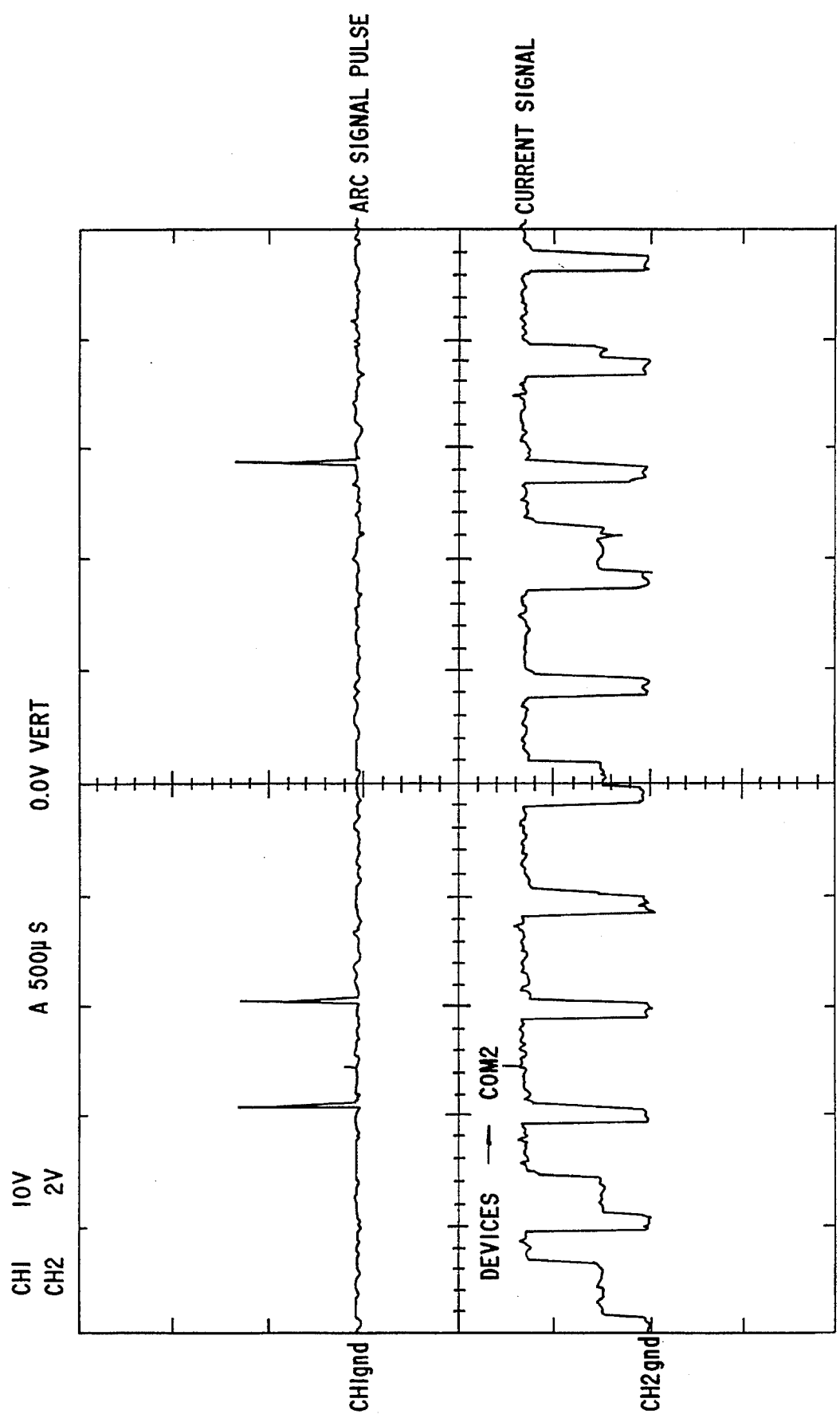
FIG. 5a illustrates an example of the classification of electro-discharge machining wave patterns using a delay circuit, in which the signals for arcs and the arc waves detected by the method of the present invention are shown.
Figure 5B:
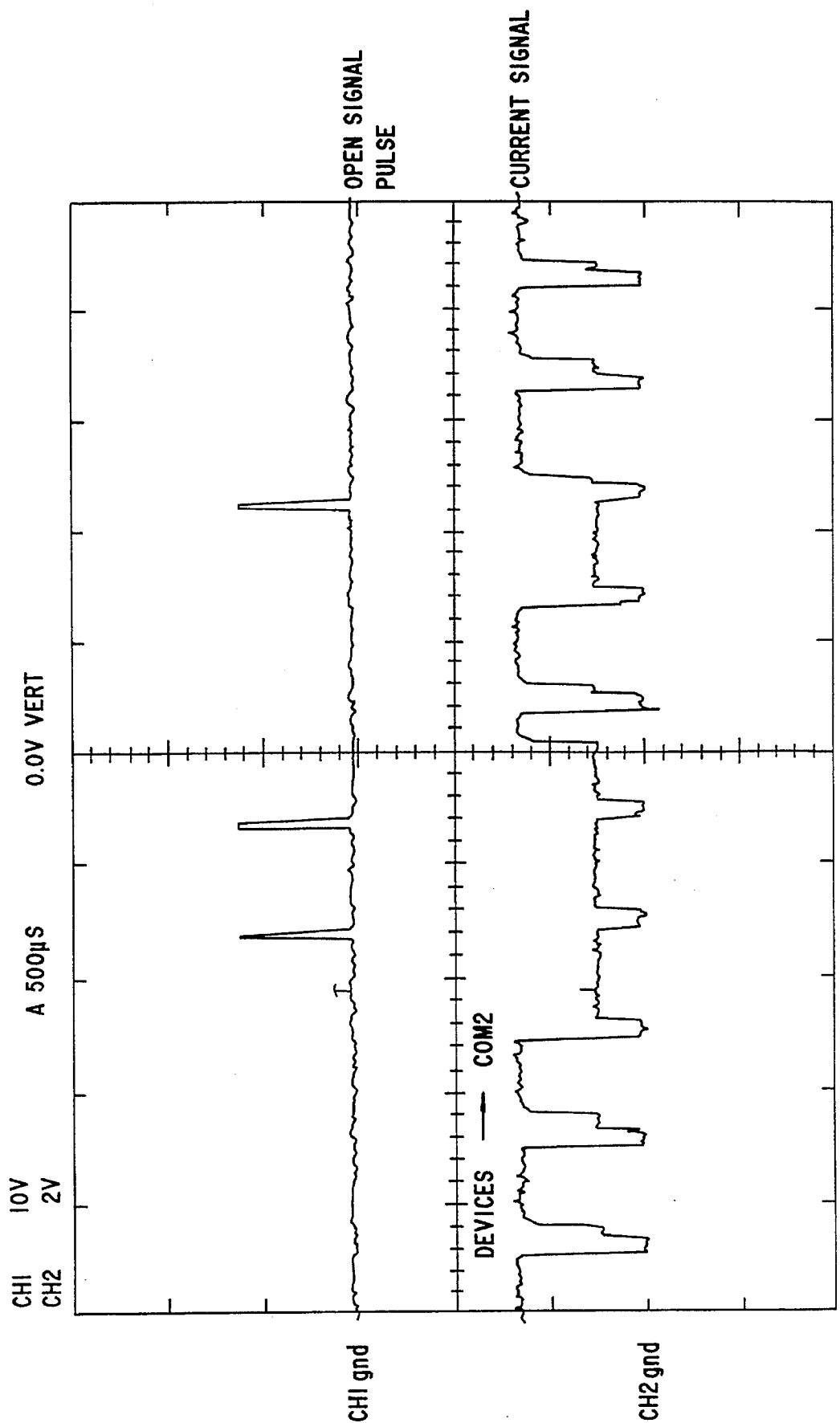
Figure 5C:
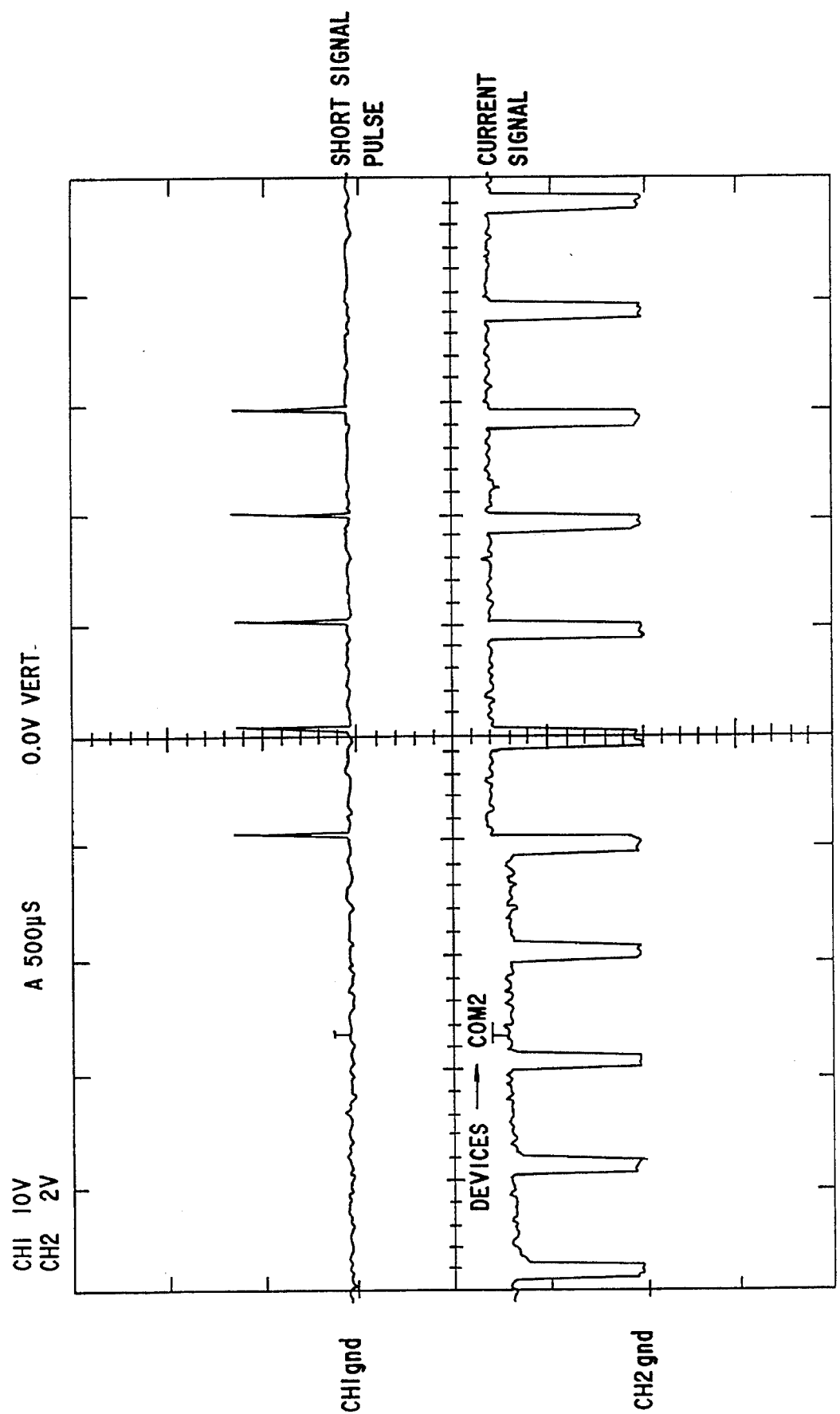

The experiment results are as shown in FIGS. 5a, 5b and 5c.

In FIG. 5a, the electro-discharge machining current signals and the detected signals corresponding to the arc signal pulses appear at the same time position. From this fact, it can be known that the arc signals and the arc detection signals well correspond to each other.

FIG. 5b illustrates a fact similar to FIG. 5a, and it can be known that the open wave detection signals well correspond to the open waves.

FIG. 5c illustrates a fact similar to FIG. 5a, and it can be known that the short detection signals well correspond to the short waves.

The signals <13>, <14> and <15> shown in FIG. 4 can be used for monitoring the state of the electro-discharge machining apparatus, and provide decisive information for the function of automatic control.

Now descriptions will be made in connection with the second object of the present invention.

There are a number of methods for monitoring the state of the electro-discharge machining as described above.

The significant difference between the second object of the present invention and the known studies is that the present invention uses the wave classification result for preventing arcs. In order to assist understanding on this matter, the known facts on the discharge waves which are generated during an electro-discharge machining will be briefly described below.

Figure 6:
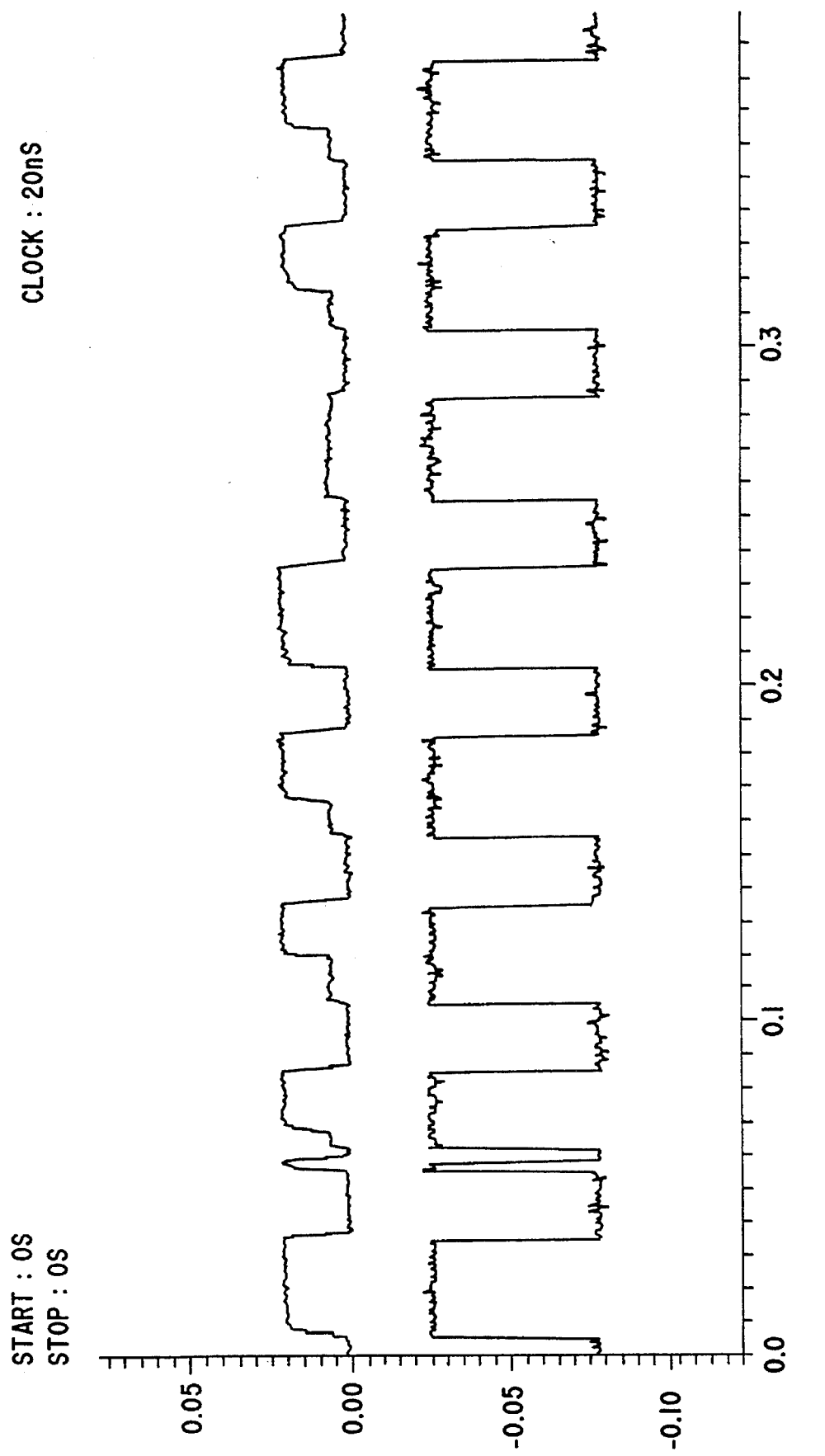
FIG. 6 illustrates schematic discharge wave patterns for showing the method of preventing arcs based on the classification of the discharge wave patterns, the upper portion of the drawing showing the discharge current waves, and the lower portion showing the pulse of an electro-discharge measuring clock (EDM clock)

Generally, when carrying out a transistorized pulsed electro-discharge machining (to be called discharge machining below), there are generated 4 types (or 5 or 6 types in some researchers) of voltage or current waves (voltage= current x resistance). That is, these waves are normal or effective discharge (or spark), arc, short and open waves (refer to FIG. 6), and, among them, the normal or effective discharge is the working component. The open waves are undesirable because they lower the machining efficiency, while the short and arc waves are also undesirable because they may cause damage to both the machining apparatus and to the object to be machined, if they continue for a long time. Therefore, if it is possible to classify the above mentioned 4 types of waves, it would contribute to monitoring the discharge machining.

According to the second object of the present invention, the above waves are classified, and, if an arc wave or a short wave is generated (an arc signal is always positioned at the leading end of each cycle), the power supply is disconnected during the relevant cycle or during a small fraction of the relevant cycle.

This second object of the present invention will be described in detail below.

In connection with the second object of the present invention, the current waves are utilized, and the wave patterns are classified, while adverse effects due to the arc or short are prevented (in the case of the voltage waves, the explanation will be the same).

The principal purpose of the classification of the discharge wave patterns is to monitor the discharge machining, thereby distinguishing the good or bad quality of the machining. Further, this information can be used for automatic control of the EDM quality.

According to the second object of the present invention, by utilizing the wave classification information, the power supply can be interrupted upon the occurrence of an arc or short, so that the discharge machining apparatus and the object to be machined will be protected from damage.

The classification is carried out in the manner described below.

Within a predetermined sampling period, the discharge waves are received, and then, the variable discharge wave signal which is adjusted to a proper voltage range is compared with two reference voltages which are pre-set by the circuit. The reference voltages consist of a high level and a low level voltage. The level setting range is such that the high level corresponds to a range of 95 to 99% of the peak value of the current wave, and the low level corresponds to a range of 25 to 90% of that value.

Figure 7:
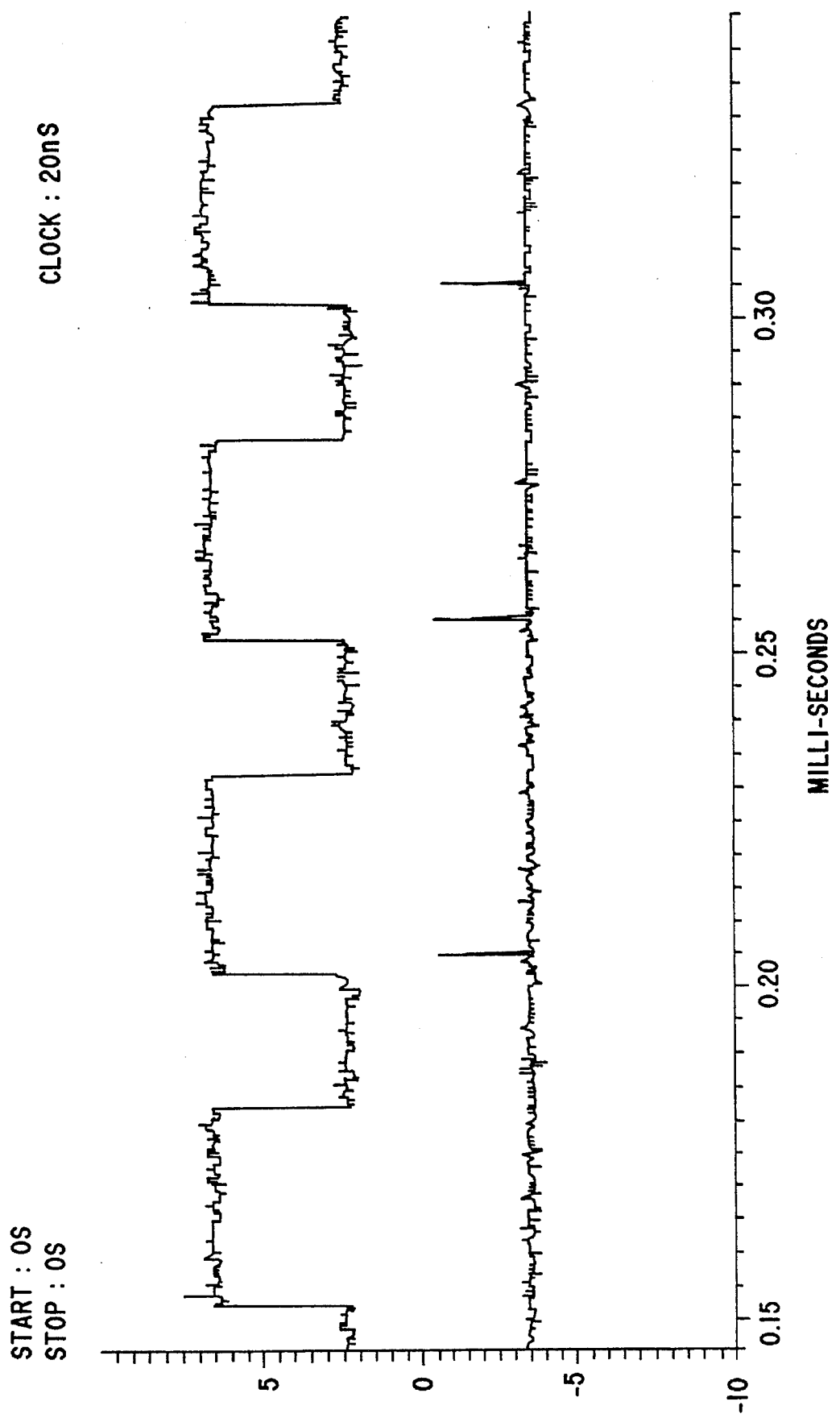
FIG. 7 illustrates the time position (positioned always at the start of the on-time) relative to the EDM clock for the sampling pulse for showing the arc preventing method based on the classification of discharge wave patterns, the upper portion of the drawing showing the EDM clock, and the lower portion showing the monitoring pulses.

The sampling time is determined as follows. That is, regardless of the types of waves produced, the cycle of the discharge wave repeats, and the cycle consists of an on-time and an off-time. According to the second object of the present invention, the sampling of the variable wave voltage is carried out only at the start of the on-time (refer to FIG. 7). Further, monitoring pulses for the sampling are generated simultaneously with the discharge on-off signals by utilizing pulses produced by the method of the first object of this invention (see FIG. 4) or by a main clock timer of the computer, and therefore, even if the lengths of the on-off signals are varied in a random manner, the variable wave voltage is sampled always at the same on-time position.

Figure 8A:
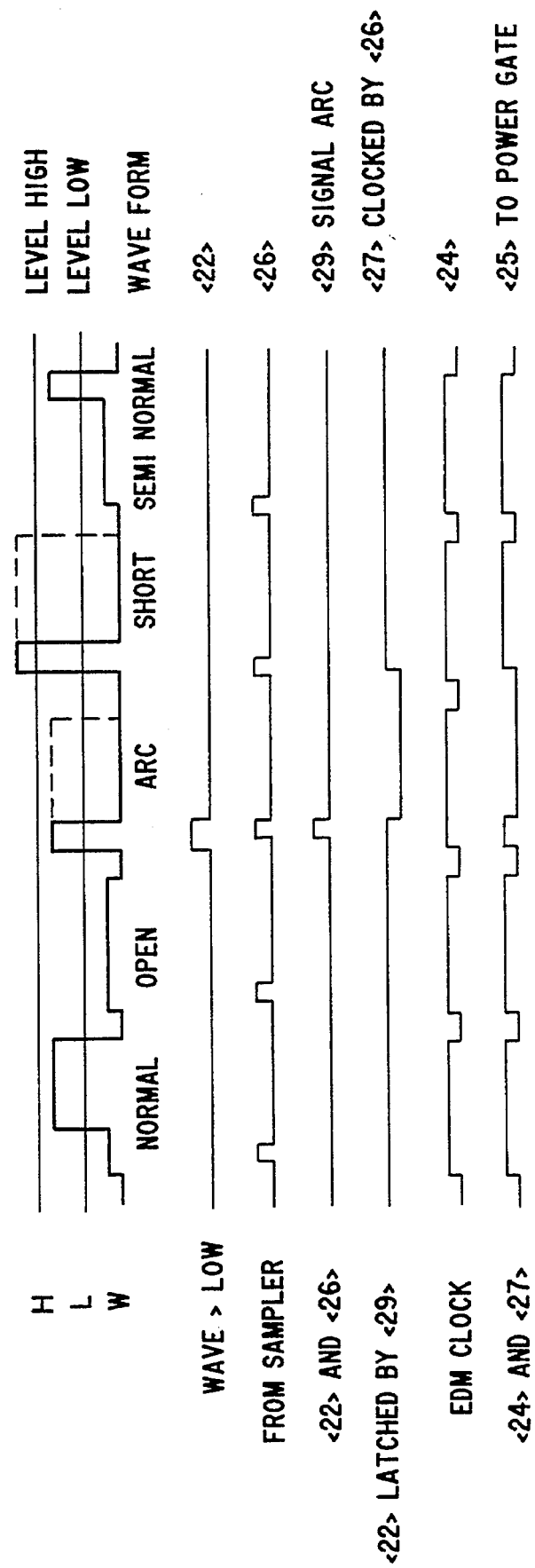
FIG. 8a is a logic chart illustrating the principle of the arc preventing method based on the classification of the discharge wave patterns.

Regarding the logic chart of FIGS. 8a and 8b, the relevant drawing illustrates by what logic structure the arc waves are detected from the discharge waves, and also illustrates by what logic structure the discharge power source is disconnected upon the generation of an arc wave. There are two methods of shutting off the discharge power. That is, one is that in which the shut-off period is fixed, and the other is that in which the shut-off period is variable.

In FIGS. 8a and 8b, W indicates the EDM discharge current wave pattern variable (to be called "input signal" below), H indicates a preset high reference level, i.e., 95 to 99% of the peak value of the input signal, and L indicates a pre-set low reference level, i.e., 25 to 90% of the peak value of the input signal. The current wave patterns are classified into 5 typical patterns for the sake of the convenience of the descriptions. Further, the portions which have no direct relationship to the present invention are omitted.

Referring to FIG. 8a, the curve shows, respectively from the left, the normal wave, the open wave, the arc wave, the short wave and the semi-normal wave. The dotted lines show the shape of the original input signals, and the solid lines show the modified shape after shutting off of the power. That is, when an arc or short occurs, the wave pattern is modified as shown by the solid lines, resulting in that the arc and short wave forms are prevented.

It should be noted that the normal wave and the semi-normal wave are similar to each other. The waves which do actually machining are the normal wave, the semi-normal wave and a part of the arc wave.

Here, in the case shown in FIG. 8a of a fixed shut-off period, <22> indicates a logic signal for the case where the input signal is higher than the low reference level. <24> indicates the signal of an EDM clock (electro-discharge machining clock), and here, there is the case that the magnitudes of the on-off periods are arbitrarily varied in accordance with the operating state of the discharge apparatus.

<26> indicates a sampling pulse which is continuously generated from the sampling circuit, and which appears always at the start of the signal <24>. (Mostly a Timing IC 8254 is used).

<29> indicates an AND logic signal for <22> and <26>, and this signal proves the generation of an arc.

<27> indicates an inverted output signal which is inputted into a D-flipflop (IC 7474) which uses the signal <26>, the inverted output being formed from the signal <22>.

<25> indicates an AND logic signal for <24> and <27>, and shows that, during the occurrence of an arc, the whole portion of the on-time becomes equivalent to the low level. That is, if the discharge power is controlled by using the signal <25>, then> the discharge power is automatically shut-off during the occurrence of an arc. .

In the case shown in FIG. 8b of a variable shut-off period, <22> indicates a logic signal for the case where the input signal is higher than the low reference level. <24> indicates an EDM clock, and here, the magnitudes of the on and off periods may be arbitrarily varied in accordance with the operating state of the discharge apparatus.

<26> indicates a sampling pulse which is continuously generated from a sampling circuit such as that disclosed in the first object of this invention or provided by a CPU, and this pulse <26> is positioned always at the start of the signal <24>. (Mostly a Timing IC 8254 is used).

<29> indicates an AND logic signal for <22> and <26>, and this signal proves the occurrence of an arc.

<23> indicates a main clock of the CPU.

<27> indicates a signal which is obtained by connecting the signal <29> to the gate of a countdown timing counter (e.g., IC 8254) using the clock <23>. The range of the down-count is set by a program of a computer.

<25> is an AND logic signal for <24> and <27>, and, in this signal, it is shown that the whole portion of the on-time is shifted to a low level during the occurrence of arc. That is, if the discharge power is controlled by using the signal <25>, then the EDM electrode discharge power is automatically shut off during the occurrence of an arc.

Here, the characteristic feature is that the input signal is sampled at the start of the on-time of every cycle by using the signal <26>, and that the signal <25> is accurately changed to an off-state upon the occurrence of an arc.

Now an actual example for the second object of the present invention will be described below.

EXAMPLE

Figure 9A:
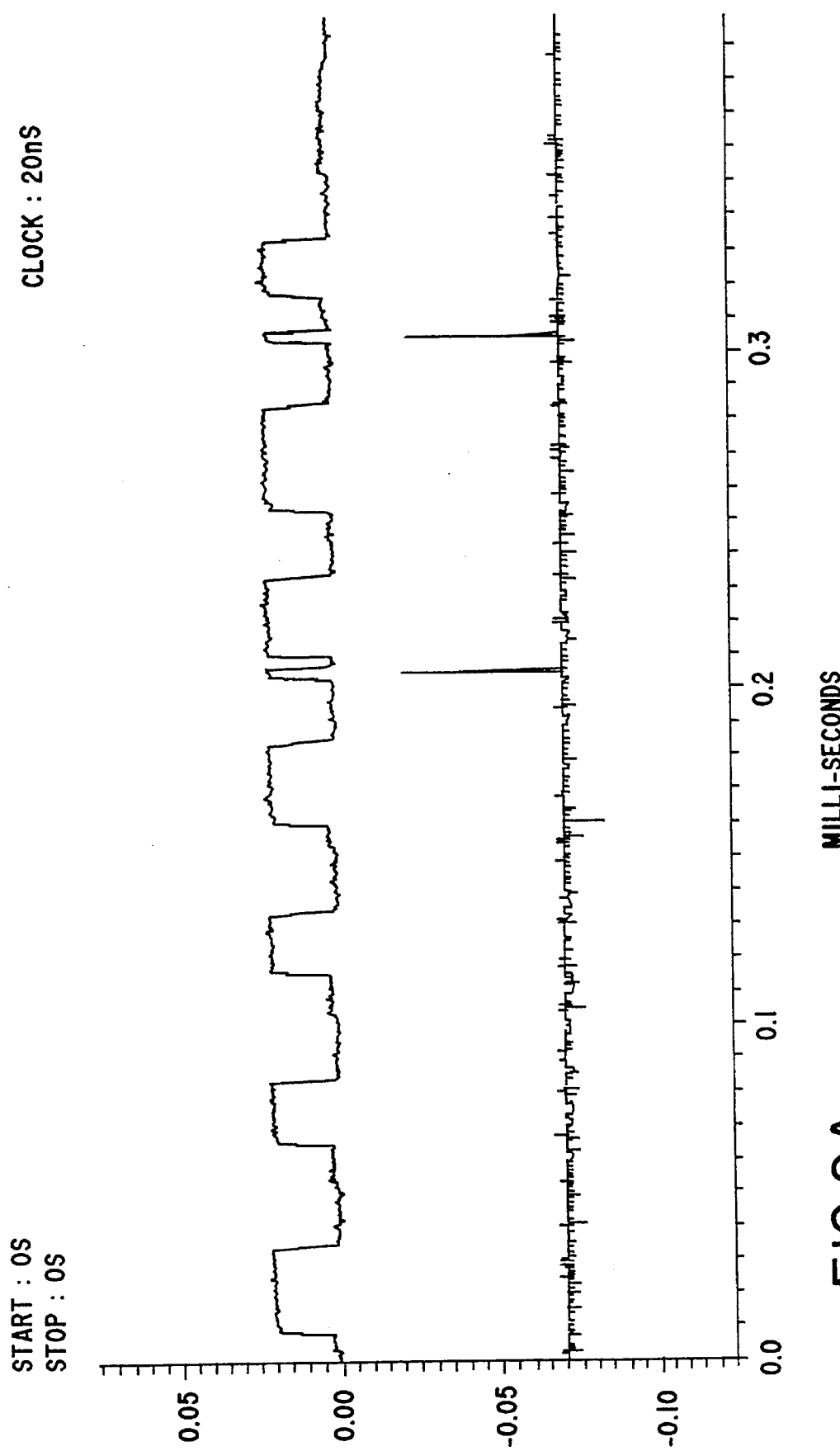
FIG. 9a illustrates the result of an example for illustrating the arc preventing method based on the classification of the discharge wave patterns, the upper portion of the drawing showing the discharge current, and the lower portion showing the arc generation signals based on the monitoring pulse.
Figure 9B:
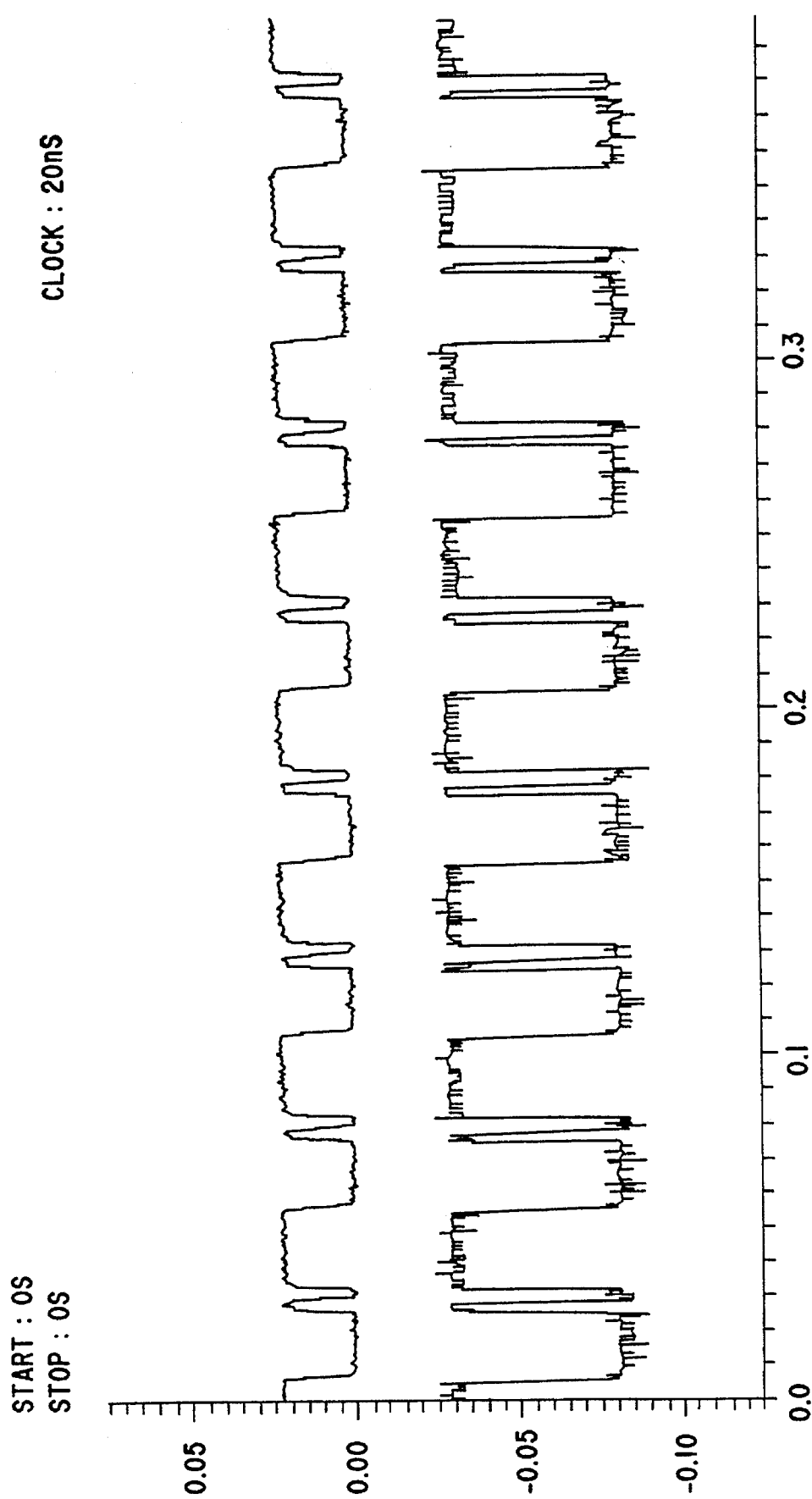
FIG. 9b illustrates a part of the effect for showing the arc preventing method based on the classification of the discharge wave patterns, the upper portion of the drawing showing the discharge current, and the lower portion showing the EDM clock.

A discharge machining apparatus was used, and the apparatus was driven by square waves in which one cycle was 50 micro seconds, and the on-time was 30 micro seconds. Then the discharge current signals of the discharge machining apparatus was supplied to an analyzing instrument. Thus, the characteristic monitoring signals corresponding to the arc waves were obtained. Under this condition, in order to confirm as to whether the discharge current wave is in an off state, the above two signals were simultaneously recorded on an oscilloscope. FIG. 9a shows the experiment results. As shown in FIG. 9b, in the cycle in which an arc monitoring signal clearly exists, it is apparent that a part of the discharge current is not being supplied. The reasons for the non-uniformity of the off period is that breakdown delay occurs due to the dielectric.

To state the effect of the second object of the present invention, even under the adverse condition as in FIG. 9b in which the arcs are continuously generated, the discharge machining could be performed in a perfect manner.

If the signal <25> is supplied to the gate of a power transistor, the intended purpose can be achieved. That is, the arc or short signals which are outputted form the discharge wave analyzer are modified by AND-logic-combining the EDM clock to the signal <25> by the function of the above described logic circuit. Thus, when an arc or short occurs, the discharge becomes impossible in the relevant cycle.

The following comparison shows corresponding relationships between various signal numbers depicted in FIGS. 3, 4, 8a and 8b representing the embodiments of this invention:

| FIG. 3 | FIG. 4 | FIG. 8a | FIG. 8b |
|---|---|---|---|
| <B1> | <s> | W | W |
| <B2> | <H> | H | H |
| <B3> | <L> | L | L |
| <B4> | <1> | — | — |
| <B5> | <2> | <22> | <22> |
| <B6>& <B7> | <3> <4> <5> | <25> <29> | <26> <29> |
| <B8> | <6> <7> <8> <13> <14> <15> | <26> <29> | <26> <29> |
| <B9> | — | <27> <25> | <27> <25> |
| <B10> | <9> | <24> | <24> |
| <B11> | <10> <11> <12> | — | — |
| <B12> | — | <26> | <26> |
| <B13> | — | — | — |
| <B14> | — | — | — |

In this chart, numbers within the representations <> are signal numbers, and numbers represented as <B> denote function blocks. The function of <B6> and <B7> are combined intrinsically. Indicated multiple signals are not produced simultaneously but one by one according to input signal type as shown on FIGS. 8a, 8b.

According to the present invention as described above, a discharge machining apparatus can be made in which damages due to an arc or short do not occur. Therefore, not only the damages due to the arc are eliminated, but also, the off-time can be reduced to an extreme degree, so that the machining efficiency can be improved.

We claim:

1. A method for classifying electro-discharge machining (EDM) wave patterns comprising the steps of:

(a) providing a first preset reference signal of a low level and a second preset reference signal of a higher level;

(b) measuring an electrical characteristic of an EDM operation to determine a wave pattern of a discharge controlled by an EDM power gate in response to a clock signal;

(c) comparing a level of a measured EDM wave pattern with each of said reference signals and providing a classified signal representative of a time said pattern level exceeds each said reference signal level;

(d) delaying and inverting said EDM power gate clock signal, and subjecting said EDM power gate clock signal to an AND logic combination with said delayed inverted EDM power gate clock signal to form a delayed and inverted monitoring signal pulse; and (e) sampling said electrical characteristic of said wave pattern under control of said monitoring pulse, which is immediately before an OFF state of said discharge, to determine a type classification of said wave pattern.

2. A method of preventing damage due to arcs by classifying electro-discharge machining (EDM) wave patterns comprising the steps of:

(a) generating a wave pattern signal representing an electrical characteristic of an EDM discharge;

(b) generating a monitoring pulse at the start of an ON time of said EDM discharge;

(c) comparing a level of said wave pattern signal with a reference potential corresponding to 25 to 90% of a peak value of the wave pattern during a high level of said monitoring pulse;

(d) obtaining, from said comparison, arc classification signals corresponding to an arc classification of said machining operation;

(e) inverting and flip-flopping said arc classification signals using said monitoring pulse as a clock; and (f) combining said inverted flip-flopped signal with an EDM clock signal in AND-logic and supplying the resulting signal to a gate of a discharge-controlling transistor to immediately shut off power of said EDM discharge to eliminate damage due to arcs.

3. A method for preventing damage due to arcs and shorts by classifying wave patterns of a variable duration transistorized pulsed electro-discharge machining (EDM) operation comprising the steps of:

(a) generating a wave pattern signal representing an electrical characteristic of each transistorized pulsed EDM discharge;

(b) generating a monitoring pulse at the start of an ON time of each variable duration transistorized pulsed EDM discharge period;

(c) during a high level of each said monitoring pulse, comparing a level of said wave pattern signal with a reference level corresponding to 25 to 90% of a peak value of said wave pattern signal to thereby obtain signals corresponding to arcs and shorts in each period of machining operation;

(d) using signals thus obtained to trigger a gate of a timing down-counter;

(e) combining an output of said timing down-counter with an EDM clock in AND-logic; and (f) supplying a signal so obtained to a gate of a discharge controlling power transistor to immediately shut off EDM discharge power to thereby prevent damage due to shorts and arcs.

4. A method for classifying electro-discharge machining (EDM) wave patterns comprising the steps of:

(a) providing a first preset reference signal of a low level and a second preset reference signal of a higher level;

(b) measuring an electrical characteristic of an EDM operation to determine a wave pattern of a discharge controlled by an EDM power gate in response to a clock signal;

(c) comparing a level of a measured EDM wave pattern with each of said reference signals and providing a classified signal representative of a time said pattern level exceeds each said reference signal level;

(d) delaying and inverting said EDM power gate clock signal and differentiating a rising edge of said delayed and inverted signal to form a monitoring pulse; and (e) sampling said electrical characteristics of said wave pattern under control of said monitoring pulse, which is immediately after an ON state of said discharge, to determine a type classification of said wave pattern.

5. A method of preventing damage due to arcs by classifying electro-discharge machining (EDM) wave patterns comprising the steps of:

(a) generating a wave pattern signal representing an electrical characteristic of an EDM discharge;

(b) generating a monitoring pulse at the start of an ON time of said EDM discharge controlled by pulse making software through a CPU pulse generator;

(d) obtaining, from said comparison, arc classification signals corresponding to an arc classification of said machining operation;

(e) inverting and flip-flopping said arc classification signals using said monitoring pulse as a clock; and (f) combining said inverted flip-flopped signal with an EDM clock signal in AND-logic and supplying the resulting signal to a gate of a discharge-controlling transistor to immediately shut off power of said EDM discharge to eliminate damage due to arcs.

6. A method for preventing damage due to arcs and shorts by classifying wave patterns of a variable duration transistorized pulsed electro-discharge machining operation comprising the steps of:

(a) generating a wave pattern signal representing an electrical characteristic of each transistorized pulsed EDM discharge;

(b) generating a monitoring pulse at the start of an ON time of said EDM discharge controlled by pulse making software through a CPU pulse generator;

(c) during a high level of each said monitoring pulse, comparing a level of said wave pattern signal with a reference level corresponding to 25 to 90% of a peak value of said wave pattern signal to thereby obtain signals corresponding to arcs and shorts in each period of machining operation;

(d) using signals thus obtained to trigger a gate of a timing down-counter;

(e) combining an output of said timing down-counter with an EDM clock in AND-logic; and (f) supplying a signal so obtained to a gate of a discharge controlling power transistor to immediately shut off EDM discharge power to thereby prevent damage due to shorts and arcs.

* * * * *

UNITED STATES PATENT AND TRADEMARK OFFICE
CERTIFICATE OF CORRECTION

PATENT NO. : 5,453,593
DATED : September 26, 1995
INVENTOR(S) : Seok-Yong et al.

It is certified that error appears in the above-identified patent and that said Letters Patent is hereby corrected as shown below:

Title page, [75] line 2 delete "Seung-Young" and substitute therefor -- Seung-Yeop --.

[73] line 1 after "Atomic" insert -- Energy --.

Signed and Sealed this

Thirtieth Day of April, 1996

Attest:

BRUCE LEHMAN

Attesting Officer

Commissioner of Patents and Trademarks